(12) United States Patent
Nicoll et al.

(10) Patent No.: US 6,356,563 B1
(45) Date of Patent: Mar. 12, 2002

(54) GLOBAL ADDRESSING AND IDENTIFIER ASSIGNMENT IN INTER-WORKED NETWORKS

(75) Inventors: Peter R. Nicoll, Piscataway; John L. Pedersen, Aberdeen, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/221,856

(22) Filed: Dec. 29, 1998

(51) Int. Cl.[7] ................................................ H04L 12/66
(52) U.S. Cl. ........................................ 370/466; 370/401
(58) Field of Search ................................. 370/465, 466, 370/401, 352, 353, 354, 389, 395, 397, 399

(56) References Cited

U.S. PATENT DOCUMENTS

| | | | |
|---|---|---|---|
| 5,440,547 A | * | 8/1995 | Easki et al. |
| 5,490,141 A | * | 2/1996 | Lai et al. |
| 5,751,971 A | * | 5/1998 | Dobbins et al. |
| 6,094,419 A | * | 7/2000 | Ohyoshi et al. ............ 370/231 |
| 6,144,669 A | * | 11/2000 | Williams et al. ............ 370/401 |
| 6,185,223 B1 | * | 2/2001 | Meyer et al. ................ 370/429 |
| 6,188,671 B1 | * | 2/2001 | Chase et al. ................ 370/232 |
| 6,188,689 B1 | * | 2/2001 | Katsube et al. ............. 370/389 |
| 6,205,152 B1 | * | 3/2001 | Von Ahnen et al. ........ 370/419 |

* cited by examiner

Primary Examiner—Douglas Olms
Assistant Examiner—Ken Vanderpuye
(74) Attorney, Agent, or Firm—Banner & Witcoff Ltd.

(57) ABSTRACT

Global address assignment of sites within an interworked network is presented. Each site is assigned a global address that is unique within the interworked network, irrespective of the network protocol of the site. For example, in a Frame Relay (FR)—Asynchronous Transfer Mode (ATM) interworked network, each FR and ATM site may be assigned both an FR Data Link Connection Identifier (DLCI), as well as a Virtual Path Identifier (VPI) and/or a Virtual Channel Identifier (VCI), wherein the combination of identifiers assigned is unique for each site, regardless of whether the site is an ATM site or an FR site. Several exemplary assignment processes are presented that are appropriate for various network configurations and that attempt to provide maximally unique global addresses. During the assignment process, which may be partially or fully automated, collisions may be removable manually and/or automatically by identifying them and making a reassignment that avoids the collision.

10 Claims, 5 Drawing Sheets

GLOBAL ADDRESSING AND IDENTIFIER ASSIGNMENT IN INTER-WORKED NETWORKS

FIELD OF THE INVENTION

The present invention is directed generally to apparatus and methods for uniquely assigning and utilizing conventionally locally-significant identifiers in a multi-protocol interworked network as global identifiers.

BACKGROUND OF THE INVENTION

A large portion of networking traffic in the world is handled by interworked networks, which involves the transfer of data across networks that follow different network protocols. An important example of interworking is the interconnection of Frame Relay (FR) networks and Asynchononous Transfer Mode (ATM) networks.

Figure 1:
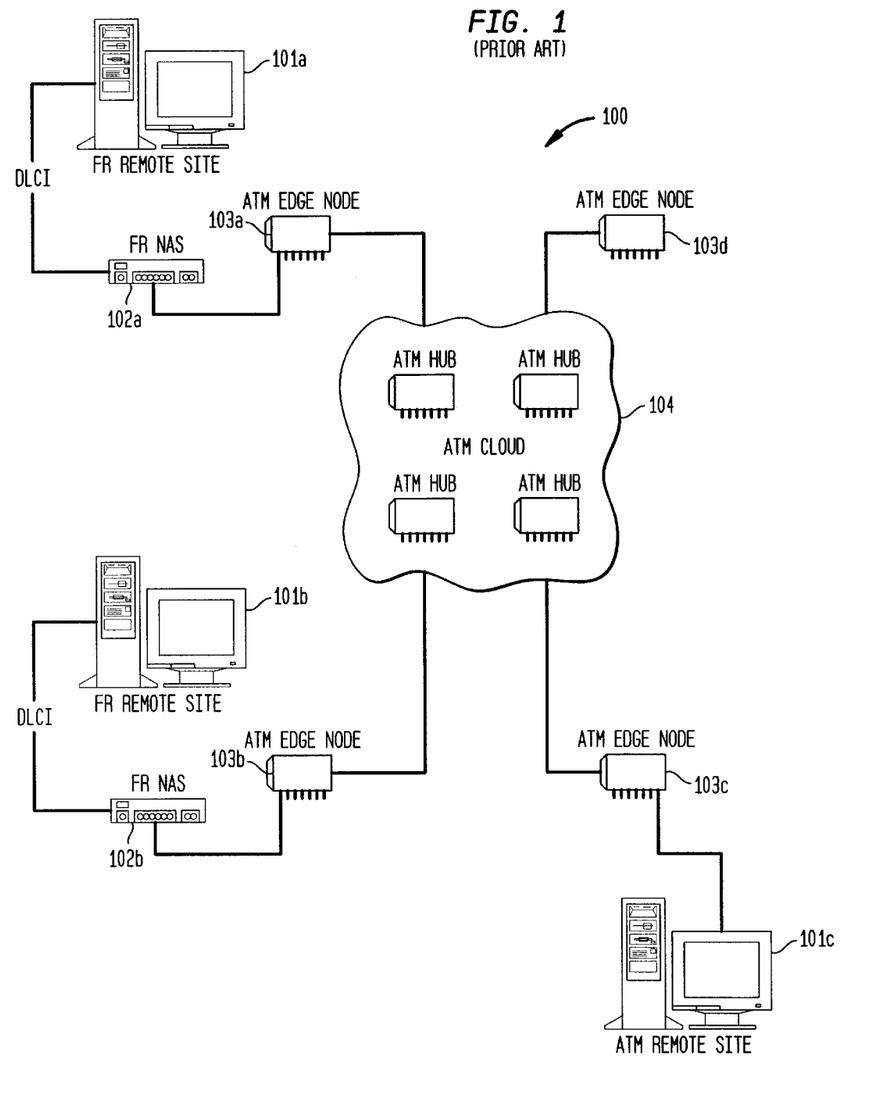
FIG. 1 illustrates an exemplary embodiment of a typical hub-and-spoke FR-ATM service interworked network.

A typical configuration of an FR-ATM service interworked network is a hub-and-spoke configuration such as is shown in FIG. 1. FR-ATM service interworked hub-and-spoke networks are often used by customers that require communication between a relatively large number of remote sites and a small set of data center hub sites. FR-ATM service interworking provides a means of bundling low-speed Permanent Virtual Circuits (PVCs) from remote sites into high-speed (e.g., DS3) data center access links.

In a hub-and-spoke network such as network 100, FR remote sites 101a–b are connected to ATM edge nodes 103a–b via FR PVCs, and ATM remote site 101c is connected directly to an ATM edge node 103c. These FR PVCs are established by FR network access shelves (NASs) 102a–b. Each FR NAS 102a–b has a plurality of network access ports for connecting to FR remote sites. The FR NAS bundles FR data together from the various network access ports, performs protocol conversion, and forwards the bundled and converted data to an ATM edge node via a feeder trunk (e.g., a single DS-3). The ATM edge nodes 103a–c provide access to the network cloud of switches and trunks that transport PVCs to an FR-ATM service gateway user-to-network/network-to-network (UNI/NNI) interface. The PVCs pass through the service gateway and enter the ATM network cloud. The ATM network cloud delivers the PVCs to the destination ATM edge nodes.

Each remote site and each ATM edge node is identified by one or more identifiers. In portions of the network using the FR protocol, the identifier is called a Data Link Connection Identifier (DLCI). In portions of the network using the ATM protocol, two identifiers, a Virtual Path Identifier (VPI) and a Virtual Channel Identifier (VCI), are used in conjunction. Each of these DLCI, VPI, and VCI identifiers is selected from a limited range of possible values and is either located in the header of, or encapsulated within, a message sent through the network.

Each PVC is terminated at one end by a remote site having an assigned DLCI and at the is other end by an ATM edge node having an assigned VPI/VCI. However, each of these identifiers typically only has local significance. In other words, one particular network element may interpret a particular DLCI (or VPI/VCI) to identify one particular PVC associated with one network access port, while another different network element may interpret the same DLCI (or VPI/VCI) to identify another different PVC associated with a different network access port. Network protocols conventionally using locally-significant identifiers are referred to herein as local network protocols.

Figure 2:
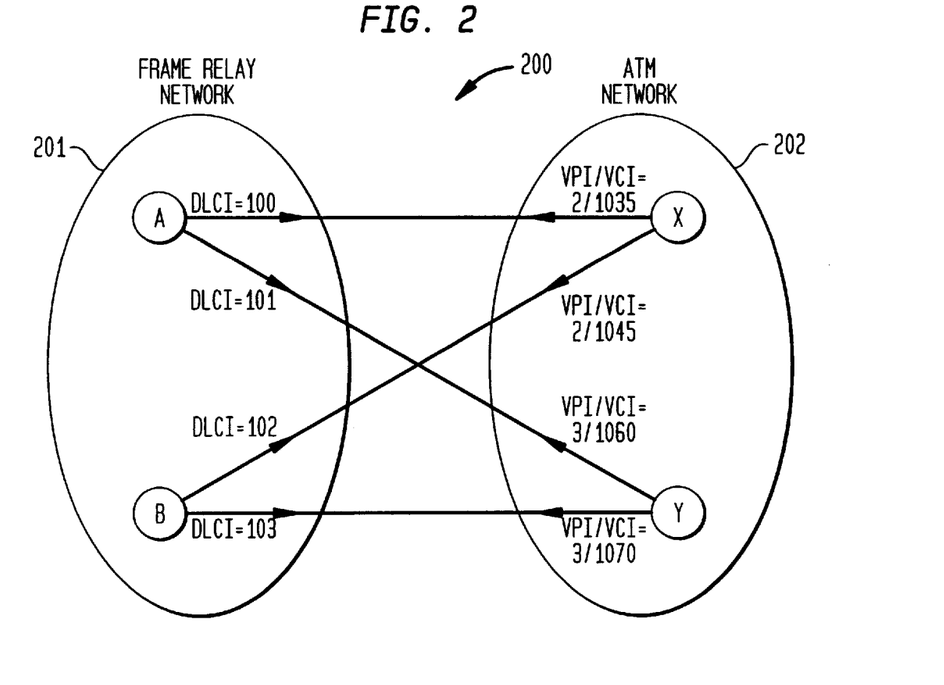
FIG. 2 illustrates an example of conventional local addressing in an FR-ATM service interworked network.

FIG. 2 illustrates an example of conventional local addressing (i.e., using a local network protocol) in an FR-ATM service interworked network 200. The interworked network 200 includes an FR network 201 interconnected with an ATM network 202. The FR network 201 includes FR sites A and B, and the ATM network 202 includes ATM sites X and Y. In order transmit data to ATM site X FR site A would use the local outgoing path defined by, e.g., DLCI=100, and FR site B would use the local outgoing path defined by, e.g., DLCI=101. In the other direction, ATM site X would use the local outgoing path defined by, e.g., VPI/VCI 2/1035 to transmit data to FR site A, and ATM site X would use the local outgoing path defined by, e.g., VPI/VCI 3/1060 to transmit data to FR site A. The DLCIs and VPI/VCIs are different for different sites because the DLCIs and VPI/VCIs are interpreted locally. Thus, the use of such local identifiers provides a scheme for selecting a local outgoing path.

The use of FR-ATM service interworking conventionally requires the assignment and use of both FR DLCI values and ATM VPI/VCI values, each of which has significance only at the local FR or ATM site. A problem with this local addressing scheme is that customers who utilize interworked networks must often handle multiple different sets of identifiers. Customers often find the non-unique assignment of multiple different sets of identifiers to be troublesome and difficult to manage.

There is therefore a need for a satisfactory method for globally assigning network-wide global identifiers for sites in heterogeneous networks (e.g., networks having FR and ATM sites). It would be a further benefit to be able to assign and utilize such global identifiers in a way that is compatible with existing network equipment and protocols.

SUMMARY OF THE INVENTION

The present invention solves at least the above-identified problems of the prior art. A global addressing and identifier assignment scheme is presented herein. The scheme introduces a global (e.g., throughout the entire interworked network) interpretation for multiple identifiers within an interworked network. The term "global identifier" or "global address" is used herein to describe an assignment by a service provider and/or customer of conventionally local identifiers in a manner that permits meaningful reference to the assigned values from remote locations.

Thus, according to one aspect of the present invention, instead of serving as locally significant identifiers for routing traffic to remote sites, the conventionally local identifiers may be interpreted as global identifiers (a.k.a. global addresses) for remote destination sites. For example, regardless of whether a destination site is a frame relay (FR) or asynchronous transfer mode (ATM) site, source FR sites may use the destination site's global Data Link Connection Identifier (G-DLCI), and source ATM sites may use the destination site's global Virtual Path Identifier/Virtual Channel Identifier (G-VPI/VCI), for routing traffic to the destination site. These global identifiers may be used in FR-to-FR transmissions as well as ATM-to-ATM transmissions. Further, ATM network nodes may continue to use the VCI/VPI to identify a destination site, and FR nodes may continue to use the DLCI to identify a destination site, just as in conventional networks, except that the identifiers are globally, instead of locally, assigned.

According to another aspect of the invention, a network-wide global addressing and identifier assignment method for interworked networks is provided, along with various exemplary embodiments of such a method. For example, in an FR-ATM service interworked network, a unique global DLCI and a unique global VPI and/or VCI may be assigned for each customer site in the interworked network, regardless of whether the site is an FR site or an ATM site.

Global identifiers may be preferably defined and assigned to each site in order to maximize the number of unique global identifiers available, since re-use of DLCIs and/or VPI/VCIs introduces the potential for confusion. Global identifier assignment schemes preferably should also effectively handle cases where the number of customer locations exceeds the number of distinct values available within an identifier (e.g., DLCI) usable range. In some assignment schemes, overlapping ranges of values for each protocol may be identified and taken into consideration in assigning the addresses such that each node has an identifier of a first protocol and an identifier of a second protocol having identical values and/or values that are otherwise related to each other in some way. In further assignment schemes, assignments may be made sequentially so that assignments can easily be performed automatically by a computer.

Assignments may be made such that there is no overlap between assigned global identifiers (i.e., each site has unique global identifiers). For example, each FR site may be assigned a global VPI/VCI identifier from a first range of available VCI/VPI values, and each ATM site may be assigned a global VCI/VPI identifier from a second range of available VPI/VCI values, the first range of VCI/VPI values and the second range of VCI/VPI identifiers being mutually exclusive ranges. Similarly, each FR site may also be assigned a global DLCI identifier from a first range of DLCI values, and each ATM site may be assigned a global DLCI identifier from a second range of DLCI values, the first range of DLCI values and the second range of DLCI values being mutually exclusive ranges. However, the various ranges of identifiers do not necessarily need to be mutually exclusive for a global assignment, so long as the assignments are globally unique for each site in the network. Any collisions that may occur between assigned identifiers during the assignment process may be removed and/or resolved manually and/or automatically by identifying the collisions and reassigning one or more identifiers in such a way that avoids the collision.

Thus, aspects of the present invention define a method comprising the steps of assigning a first address of a first network protocol to each of a first plurality of sites of a first network and to each of a second plurality of sites of a second network interworked with the first network, the first network conforming to the first network protocol and the second network conforming to a second network protocol different from the first network protocol; and assigning a second address of the second network protocol to each of the first plurality of sites and to each of the second plurality of sites, wherein a combination of the first and second addresses assigned to each of the first and second plurality of sites is globally unique to each of the first and second plurality of sites.

Further aspects of the present invention define, in an interworked network comprising a first network conforming to a first local network protocol interworked with a second network conforming to a second local network protocol different from the first local network protocol, a method comprising the steps of setting an identifier in a message of the first local network protocol destined for a destination site of the interworked network to be equal to a unique value associated with the destination site, regardless of whether the destination site is a site of the first network or of the second network; interpreting the identifier of the first local network protocol to be a global address of the destination site, the global address being unique within the interworked network; and forwarding the message to the destination site according to the global address.

Still further aspects of the present invention define an interworked network comprising a first network conforming to a first local network protocol interworked with a second network conforming to a second local network protocol different from the first local network protocol, the interworked network comprising a destination site; a first site of the first network configured to set an identifier in a message of the first local network protocol destined for the destination site to be equal to a unique value associated with the destination site, regardless of whether the destination site is a site of the first network or of the second network, and further configured to interpret the identifier of the first local network protocol to be a global address of the destination site, the global address being unique within the interworked network; and a plurality of sites including the first site configured to forward the message to the destination site according to the global address.

The above aspects of the present invention may be implemented to provide a customer with a set of maximally unique network-wide global identifier assignments for an interworked network. The global identifier assignment method of the present invention may be manually implemented and/or supported by automated provisioning tools. Such global identifier assignments are useful for both homogeneous (e.g., FR-FR or ATM-ATM and heterogeneous (e.g., interworked) configurations. In the example of an FR-ATM service interworked network, the present invention allows for the evolution from lower speed FR site interfaces to higher speed ATM site interfaces with minimal modifications to existing site FR and/or ATM identifier assignments.

It will become obvious to one of ordinary skill in the art reading this specification that the above-described aspects of the present invention can be readily expanded with very little experimentation to be utilized in heterogeneous networks that use more than two different protocols and that use any number of identifiers. Further, although this specification specifically addresses FR-ATM service interworked networks, the present invention is applicable to any homogeneous or heterogeneous network using any one or more network protocols, including, but not limited to, FR and/or ATM.

DETAILED DESCRIPTION OF PREFERRED EMBODIMENTS

The following description of embodiments of the invention will refer to a Frame Relay (FR) network interworked with an Asynchronous Transfer Mode (AM) network. However, the description of an FR-ATM service interworked network is merely illustrative and is not at all intended to limit the invention thereto. The present invention may be utilized with any type of homogeneous or heterogeneous network using any number of different network protocols and/or identifiers.

According to an illustrative embodiment of the invention, a global DLCI (G-DLCI) and a global VPI/VCI (G-VPI/VCI) may be assigned to each FR and ATM site. FR sites in an FR-ATM service interworked network may use G-DLCIs for data transmission to an ATM destination, and ATM sites may use G-VPI/VCIs for data transmission to an FR destination. Conventionally local identifiers may be given a global (e.g., throughout the entire interworked network) interpretation within an interworked network. Thus, instead of serving as locally significant identifiers for routing traffic to remote sites, conventionally local identifiers may be interpreted as global identifiers (e.g., G-DLCI, G-VPI, and/or G-VCI). Each site would be assigned its own unique set of global identifiers, effectively treating the global identifier as a unique address of the site.

Global addressing is not a rigidly defined or required service feature. Global addressing is an optional address assignment process that may be implemented through the cooperation and coordination between the service provider and the customer in order to provide the customer with some operational convenience or benefit. Because global addressing may be provided as an optional service, there may be provided a predetermined and/or customer-selectable identifier indicating whether a specified customer is to have addresses treated as global identifiers according to the above-described invention or as conventional local identifiers.

Figure 3:
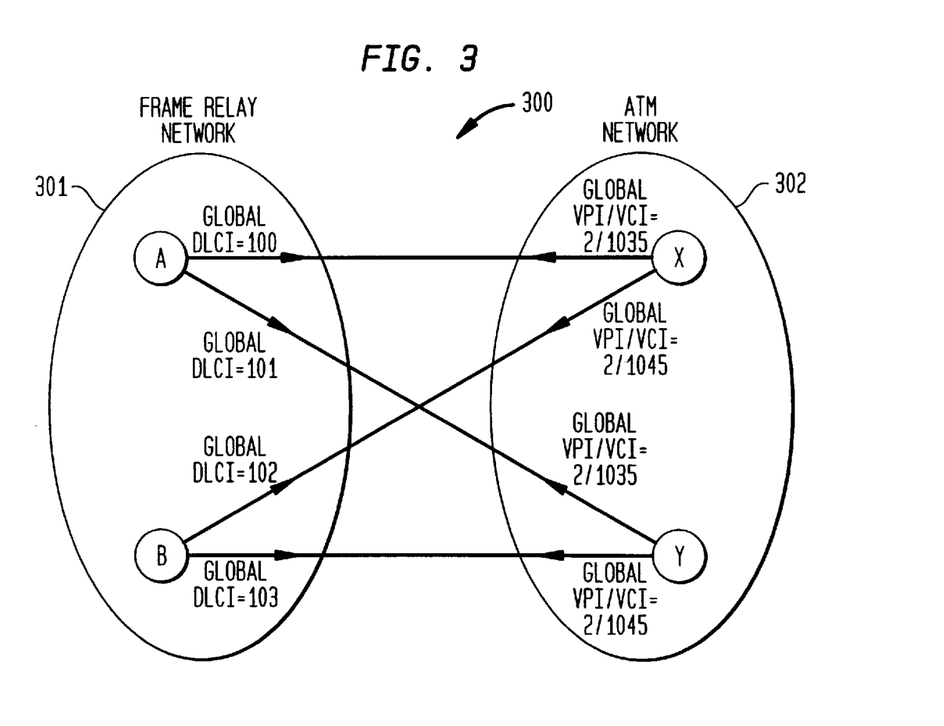
FIG. 3 illustrates an exemplary embodiment of global addressing in an FR-ATM service interworked network in accordance with aspects of the present invention.

Referring to FIG. 3, an exemplary FR-ATM service interworked network 300 is shown that operates in accordance with aspects of the present invention. The interworked network 300 includes an FR network 301, which includes FR sites A and B, and an ATM network 302, which includes ATM sites X and Y. In contrast to the interworked network 200 illustrated in FIG. 2, each site may be assigned a unique G-DLCI and G-VPI/VCI. For example, both FR sites A and B would use, e.g., global DLCI=100 to transmit data to ATM site X, and both FR sites A and B would use, e.g., global DLCI=101 to transmit data to ATM site Y. Similarly, both ATM sites X and Y would use, e.g., global VPI/VCI=2/1035 to transmit data to FR site A, and both ATM sites X and Y would use, e.g., global VPI/VCI=2/1045 to transmit data to FR site B. Sites in an ATM network (or ATM portion of an interworked network) may always use the same VCI/VPI to identify a particular destination site, regardless of whether the destination is an FR or ATM site. Sites in an FR network (or FR portion of an interworked network) may always use the same DLCI to identify a particular destination site, regardless of whether the destination is an FR or ATM site. Thus, each site in the network may be addressed using a unique set of global identifiers (e.g., G-DLCI and G-VPI/VCI), thereby providing a scheme for selecting the ultimate destination site instead of selecting the local outgoing path.

There are various factors to consider in assigning global identifiers. For instance, a global identifier assignment scheme should take into account the different address ranges associated with the different types of identifiers. For example, the ATM VPI/VCI identifier has a larger available address range than the FR DLCI. An assignment scheme should also provide for unique assignments for as many customer sites as possible, since the re-use of DLCI and VPI/VCI combinations may introduce the potential for confusion. Also, an assignment scheme should effectively handle situations in which the number of customer sites exceeds the number of distinct values available within an identifier's useable range and/or where particular identifier values are unusable (e.g., reserved or already assigned).

Several exemplary embodiments of a global identifier assignment method are presented below that are designed to take into account one or more of the above-discussed factors, as well as many other factors such as simplicity and the cost of implementation and maintenance.

The embodiments of a global identifier assignment method described below are each presented as a sequence of steps for execution in order to attain a maximally unique and orderly assignment of available DLCI and VPI(VCI values for different customer network scenarios. The methods are primarily intended for new deployments with all DLCI and VPI/VCI values initially available for use. However, the present invention may be implemented in pre-existing networks that already have pre-existing identifier assignments and/or reserved identifier values. In such networks, various ranges of identifier values may be pre-assigned and/or unusable. Therefore, at least some capability for handling unusable values is included in these embodiments (for example, skipping to the next available value). The best results will be obtained, however, when all values are usable and when pre-assigned values are reassignable.

Exemplary Embodiment A of Global Identifier Assignment Method

Figure 4:
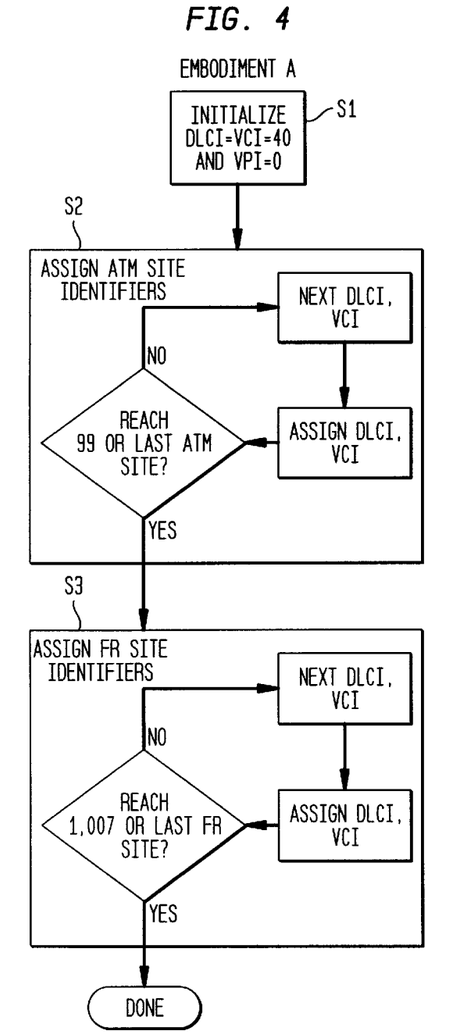
FIG. 4 illustrates a first exemplary embodiment of steps for assigning global identifiers in accordance with aspects of the present invention.

Referring to FIG. 4, exemplary Embodiment A of an assignment method for assigning global identifiers to ATM and FR ports is now described. This embodiment ensures that no G-VCI values are re-used, and is most effectively utilized where the number of ATM sites and FR sites together is no more than the number of G-DLCI values available. Thus, Embodiment A is suitable for many small-scale global addressing requirements. If network growth beyond this limitation is anticipated, Embodiment A is not optimal, since there would not be enough unique global identifiers available. In such a case, Embodiments B or C (described below) should preferably be utilized.

In step S1, variables representing the values of the G-DLCI, G-VCI, and G-VPI are initialized to a predetermined starting set of values (e.g., 40, 40, and 0, respectively). The starting set of values may be defined to take into account reserved unusable values (e.g., DLCI values 0–39 may be reserved). In this particular embodiment, it does not matter to what value the G-VPI is initialized, since the VPI is not used.

In step S2, an iterative set of sub-steps may be executed to determine the next available G-DLCI and G-VCI (e.g., in the range of 40–99). The next available G-DLCI and G-VCI may be determined by incrementing or decrementing both by a constant or a variable to the next available value, by random selection, and/or by any other algorithm. In this embodiment, both the G-DLCI and the G-VCI are of the same value throughout the assignment process. It does not matter how the G-DLCI and G-VCI values are chosen, as long as they are unique for each ATM hub site. Indeed, the range of values chosen does not need to be continuous.

Further, in choosing the next available G-DLCI and G-VCI, if a particular G-DLCI and/or G-VCI value is reserved, pre-assigned, or otherwise unavailable, it may be skipped and then next available G-DLCI and G-VCI may be selected. The sub-steps of step S2 may be iteratively repeated until all of the desired ATM hub sites are assigned or until the G-DLCI=G-VCI values reach a maximum number and/or are otherwise exhausted.

Thus, step S2 ensures that each of the ATM hub sites involved in the assignment process is assigned a unique G-DLCI and G-VCI value, wherein the value of the G-DLCI equals the value of the G-VCI. According to this embodiment, no ATM hub site has the same G-DLCI and G-VCI as another ATM hub site.

The FR remote sites are assigned global identifiers in step S3. These global identifiers should have values different from the values used to assign the ATM hub sites. For example, if the ATM sites were assigned values within the range of 40–99, then the FR sites may be assigned global identifiers having values within the range of 100–1,007. Again, the precise algorithm for choosing the values of the G-DLCI and G-VCI is unimportant, as long as the values are unique for each FR site and do not overlap with the values chosen for the ATM sites.

In step S3, new G-DLCI and G-VCI values are chosen, and an FR site is assigned a G-DLCI and G-VCI value (G-DLCI=G-VCI). The sub-steps of step S3 may be iteratively repeated until a last or a predetermined maximum (e.g., 1,007) G-VCI/G-DLCI value is reached, or until the last FR site to be assigned is reached, in which cases step S3 would terminate.

Thus, step S3 ensures that each of the FR remote sites involved in the assignment process is assigned a unique G-DLCI and G-VCI value, wherein the value of the G-DLCI equals the value of the G-VCI. According to this embodiment, no FR remote site has the same G-DLCI and G-VCI as another FR remote site or ATM hub site.

As an example of the size of network that may utilize Embodiment A, assume that the available G-DLCI range is 40–1,007 and the available G-VCI range is 40–1,007. Thus, the total number of unique identifiers defined by G-DLCI and G-VCI is 968 (since G-DLCI=G-VCI). If the ATM hub sites are only assigned G-DLCI and G-VCI values selected from the range of 40–99, and the FR remote sites are only assigned G-DLCI=G-VCI values selected from the range of 100–1,007, then there are 60 distinct global identifiers/ addresses available for assignment to ATM hub sites, and there are 908 distinct global identifiers/addresses available for assignment to FR remote sites. These ranges are purely exemplary, and the available ranges may be defined and divided in any manner desired.

Some or all of the steps shown in embodiment A may be performed sequentially and/or simultaneously. Further, the FR sites may be assigned prior to the ATM sites being assigned. In other words, step S3 may be performed before or simultaneous with step S2.

Exemplary Embodiment B of Global Identifier Assignment Method

Figure 5:
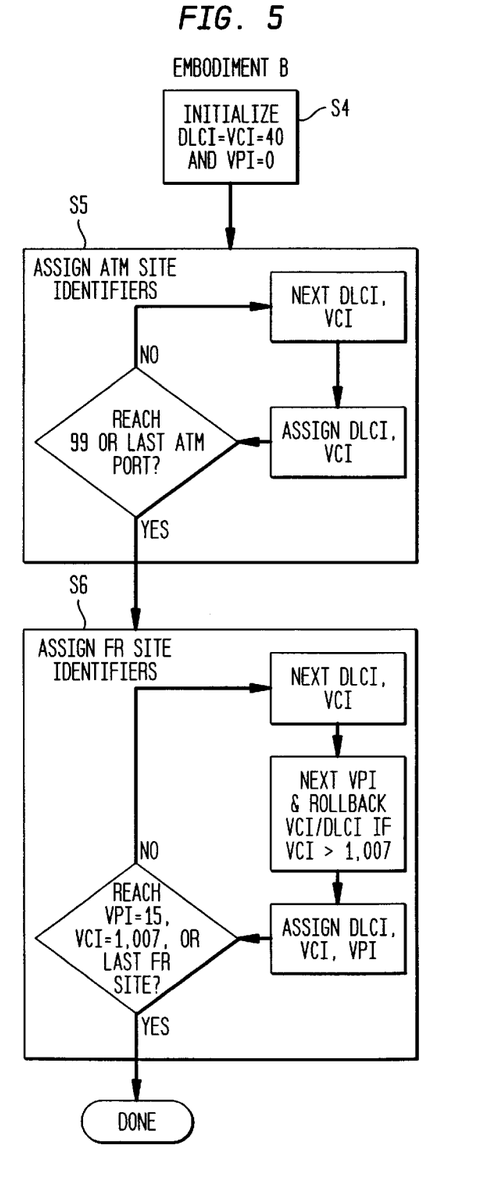
FIG. 5 illustrates a second exemplary embodiment of steps for assigning global identifiers in accordance with aspects of the present invention.

FIG. 5 illustrates exemplary Embodiment B of the global identifier assignment method. Global identifiers may be assigned in a manner similar to Embodiment A, except that in assigning global identifiers to FR sites, the G-VPI may also be varied (e.g., over the range 0–15). This embodiment allows for more FR sites to be assigned than in Embodiment A by providing a set of G-DLCI and G-VCI values (e.g., over the range 100–1,007) for each G-VPI value.

Step S4 is performed as in step S1 of FIG. 4, and step S5 is performed as in step S2 of FIG. 4. However, although the use of a constant VPI will generally be adequate for typical network configurations, the VPI may also be varied in step S5 to provide additional global addresses available for assignment to ATM hub sites.

In step S6, new G-DLCI and G-VCI values are chosen (G-DLCI=G-VCI). If the G-VCI value is greater than a predetermined maximum value (e.g., 1,007), then a next available G-VPI value is chosen and the available range of values for the G-DLCI and G-VCI are "rolled back" or reset so that they may be chosen again. Then an FR site is assigned a G-DLCI, G-VPI, and G-VCI value. As in Embodiment A, the G-DLCI and G-VCI values are always equal to each other. Once the available G-DLCI and G-VCI values are exhausted for a particular value of the G-VPI, a new G-VPI value is chosen (e.g., by incrementing and/or decrementing the G-VPI value). When a new G-VPI value is chosen, the set of values available for the G-DLCI and G-VCI is reset and again available for assignment. The sub-steps of step S6 may be iteratively repeated until a last G-VPI value, G-VCI value, or FR site to be assigned is reached.

Some FR sites may have connections to other FR sites (in addition to FR-ATM connections). These FR sites will not need to communicate through an ATM site to communicate with certain other FR sites, and would only need to utilize the G-DLCI global identifier. It is therefore preferable to assign each of these FR sites (the FR sites having FR-FR connections) a unique G-DLCI among themselves, thereby eliminating the possibility of two destination FR sites having the same G-DLCI. Accordingly, it is preferable to assign these FR sites first in step S6. When such an assignment is performed, it is clear that there can be no more FR sites having an FR-FR connection than there are available G-DLCI values.

After the FR sites having FR-FR connections are assigned, the remaining FR sites (i.e., those sites with FR-ATM connections only) may be assigned. It is preferable to group assignments of the remaining FR sites by ATM hub site (i.e., one ATM hub site at a time). This assignment grouping will prevent the possibility of an ATM hub requiring connectivity to multiple remote sites with redundant identifiers, which can occur when the number of remote sites exceeds the number of available distinct identifiers. To assign FR sites one ATM hub site at a time, it is preferable that PVC connectivity between remote sites and hubs is predefined.

As an example of the size of network that may utilize Embodiment B, assume that the available G-DLCI range is 40–1,007, the available G-VCI range is 40–1,007, and the available G-VPI range is 0–15. Thus, the total number of unique identifiers defined by the G-DLCI, G-VPI and G-VCI is 15,488 (968 values of DLCI×16 values of VPI). If the ATM hub sites are only assigned G-DLCI=G-VCI values selected from the range of 40–99 (with VPI being held constant, e.g., zero), the FR remote sites are only assigned G-DLCI=G-VCI values selected from the range of 100–1, 007 and VPI values selected from the range of 0–15, then there are 60 distinct global identifiers/addresses available for assignment to ATM hub sites (which is typically a sufficient), and there are 14,528 (908 values of DLCI×16 values of VPI) distinct global identifiers/addresses available for assignment to FR remote sites. These ranges are purely exemplary, and the available ranges may be defined and divided in any manner desired. For example, other additional VPI values in the range of 1–15 may be used in conjunction with DLCI/VCI values 40–99 to provide additional ATM site global addresses.

Some or all of the steps shown in embodiment B may be performed sequentially and/or simultaneously. Further, the FR sites may be assigned prior to the ATM sites being assigned. In other words, step S6 may be performed before or simultaneous with step S5.

Exemplary Embodiment C of Global Identifier Assignment Method

Figure 6:
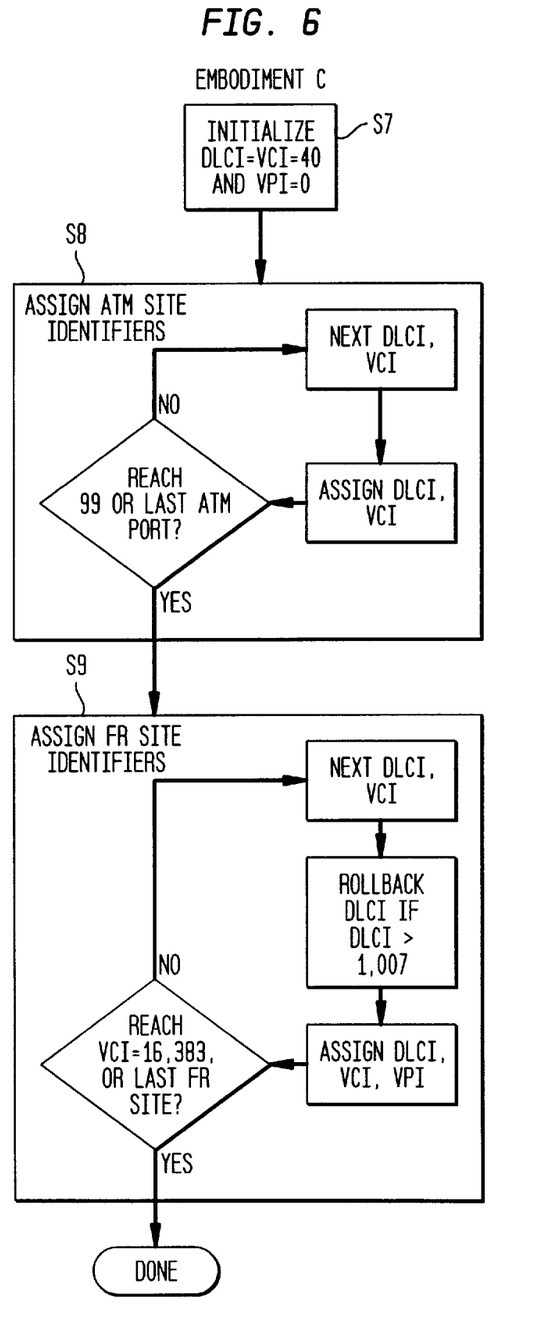
FIG. 6 illustrates a third exemplary embodiment of steps for assigning global identifiers in accordance with aspects of the present invention.

FIG. 6 illustrates exemplary Embodiment C of a global identifier assignment method. Embodiment C is similar to Embodiment B, but with a primary difference being the manner in which the set of available G-VP/VCI combinations is extended. Instead of appending an incrementally assigned G-VPI identifier, this method uses higher G-VCI values (e.g., up to 16,383) than would be used in Embodiments A and B.

Step 7 is performed as in step S1 of FIG. 4, and step S8 is performed as in step S2 of FIG. 4.

In step S9, each FR site is assigned a G-DLCI and G-VCI value. Unlike Embodiments A and B, the G-DLCI and G-VCI values do not necessarily always equal each other. The G-VCI values may be chosen from a range greater than that available for the G-DLCI (e.g., up to 16,383). Thus, when the G-VCI value is greater than the highest available G-DLCI value, the G-VCI value no longer equals the G-DLCI value.

In step S9, new G-DLCI and G-VCI values are chosen. If the G-DLCI value is greater than a predetermined maximum value (e.g., 1,007), then the G-DLCI is "rolled back" or reset to the beginning of the available range. Then, an FR site is assigned a G-DLCI and G-VCI value, which may not necessarily be equal to each other. The sub-steps of step S9 may be iteratively repeated until a last G-VCI value or FR site to be assigned is reached.

Some FR sites may have connections to other FR sites (in addition to FR-ATM connections). These FR sites will not need to communicate through an ATM site to communicate with certain other FR sites, and would only need to utilize the G-DLCI global identifier. As in Embodiment B, it is preferable to first assign FR sites having FR-FR connections a unique G-DLCI among themselves. Accordingly, it is preferable to assign these FR sites first in step S9.

After the FR sites having FR-FR connections are assigned, the remaining FR sites (i.e., those sites with FR-ATM connections only) may be assigned. It is preferable to group assignments of the remaining FR sites by ATM hub site (i.e., one ATM hub site at a time).

As an example of the size of network that may utilize Embodiment C, assume that the available G-DLCI range is 40–1,007 and the available G-VCI range is 40–16,383. Further assume that G-DLCI=G-VCI generally only for the first 908 assigned FR sites. If the ATM hub sites are only assigned G-DLCI and G-VCI values selected from the range of 40–99, and the FR remote sites are only assigned G-DLCI values selected from the range of 100–1,007 (908 distinct values) and G-VCI values selected from the range of 100–16,383 (16,284 distinct values), then there are 60 distinct global identifiers/addresses available for assignment to ATM hub sites, and there are 16,284 distinct global identifiers/addresses available for assignment to FR remote sites. Of the 16,284 FR remote sites that may be assigned unique global addresses, up to 908 of them could be FR-FR connected sites. This is because it is preferable that each FR-FR site have a unique G-DLCI among themselves (as discussed above). All ranges discussed herein are purely exemplary, and the available ranges may be defined and divided in any manner desired.

Some or all of the steps shown in embodiment C may be performed sequentially and/or simultaneously. Further, the FR sites may be assigned prior to the ATM sites being assigned. In other words, step S9 may be performed before or simultaneous with step S8.

Exemplary Embodiment D of Global Identifier Assignment Method

Figure 7:
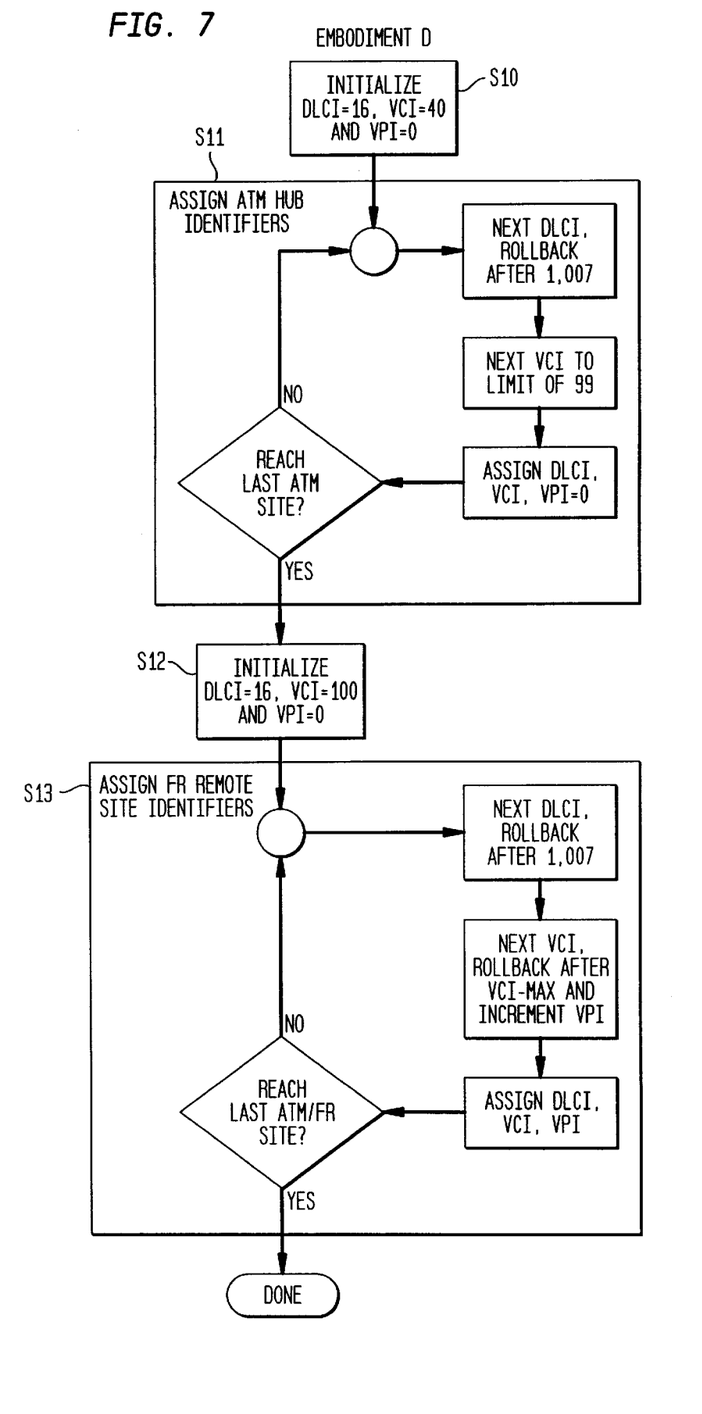
FIG. 7 illustrates a fourth exemplary embodiment of steps for assigning global identifiers in accordance with aspects of the present invention.

Exemplary embodiment D, which is illustrated in FIG. 7, is a combination of Embodiments B and C. This embodiment introduces the concept of a VCI-max parameter, described below.

In step 10, the G-DLCI, G-VCI, and G-VPI are initialized to 16, 40, and 0 (for example) respectively, as in step S1 of FIG. 4.

Hub ATM sites are assigned global identifiers in step S11. The G-DLCI may be "rolled-back" or reset after it reaches a predetermined value (e.g., 1,007) or once the available G-DLCI values are otherwise exhausted. The G-VCI may then be incremented or otherwise chosen within the range of, e.g., 0–99. This exemplary G-VCI range is large enough to cover most networks, except for the unusual network having a very large number of ATM hub sites. Then, the remote site is assigned G-DLCI, G-VCI, and G-VPI values. The value of the G-VPI may be, e.g., a constant zero. The sub-steps of step S11 may be iteratively repeated until the last ATM hub site to be assigned is reached.

It is generally not necessary to vary the VPI value, since an adequate number of global addresses for ATM hub sites will generally be available in step S11. However, as in step S5 of Embodiment B, the VPI may also be varied in step S11 if necessary to provide additional global addresses available for assignment to ATM hub sites. For example, other additional VPI values in the range of 1–15 may be used in conjunction with DLCI/VCI values 40–99 to provide additional ATM site global addresses.

After the last hub ATM port is assigned, the G-DLCI, G-VCI, and G-VPI values may be initialized in step S12 to the values 16, 100, and 0 (for example), respectively.

The FR remote sites and the ATM remote sites are assigned global identifiers in step S13. The G-DLCI may be "rolled-back" or reset after it reaches a predetermined value (e.g., 1,007) or once the available G-DLCI values are otherwise exhausted. The G-VCI may then be incremented or otherwise chosen within the range of, e.g., 0-VCI-max.

The VCI-max parameter is a customer profile parameter that may be assigned independently for each customer and may be set, for example, at the time global addressing is activated. In some embodiments, the customer and/or the service provider may be able to define a customer-specific value of the VCI-max parameter value. This may be accomplished, for example, via a user interface with the network. The user interface may display the VCI-max parameter value entered for the given customer. A computer within the network may automatically determine whether the VCI-max parameter chosen by the customer will be supported by the network equipment.

The VCI-max parameter defines the limit on the range of G-VCI values before the value of G-VPI is incremented and G-VCI rolled back. If the value of G-VCI is set to 1,007 or less (for example), the assignment is similar to Embodiment B, although G-DLCI and G-VCI may not be assigned the same values. If a VCI-max higher than 1,007 (for example) is assigned (the value of VCI-max potentially ranging up to 16,383), the assignment of the G-VCI and G-DLCI are independent and the assignment process is similar to that of Embodiment C. Intermediate values of VCI-max may also be used for alternative G-VCI re-use scenarios.

When the G-VCI values are exhausted or have exceeded VCI-max, then the G-VCI may be "rolled-back" or otherwise reset and a new G-VPI may be incremented or otherwise chosen. Then, the remote site is assigned G-DLCI, G-VCI, and G-VPI values. The sub-steps of step S13 may be iteratively repeated until the last remote site to be assigned is reached.

Some or all of the steps shown in embodiment D may be performed sequentially and/or simultaneously. Further, the remote sites may be assigned prior to the ATM hub sites being assigned. In other words, steps S12 and S13 may be performed before or simultaneous with steps S10 and S11. Further, the G-DLCI=G-VCI characteristic of the first method preferably is not adhered-to. This non-adherence provides the benefit of avoiding potential confusion associated with expanding the network beyond the G-DLCI=G-VCI limit. Thus, the convenience for lower ranges of G-VCI of having G-DLCI=G-VCI is foregone to avoid the danger of confusion when the G-DLCI values reach the rollover point.

All ranges discussed herein are purely exemplary, and the available ranges may be defined and divided in any manner desired.

The G-VPI/VCI and G-DLCI values may be initialized to default values using any of the above-described embodiments and/or modified by the customer and/or the service provider via a user interface. The user-interface should check override values entered (changing the default values) to prevent collisions or attempts to assign unavailable values.

Further, a port-level configuration interface (e.g., a display) may be provided in the user interface to aid in the configuration of PVC connections between global identifiers and/or site numbers. Selected global identifiers may be obtained from site assignments defined through, e.g., another interface. Global identifiers may be manually and/or automatically overwritten where particular sites are to be assigned specific site addresses. Modification of any global identifiers should propagate to all affected port-level assignments for all cases where the PVCs were previously associated with global site identifiers. Manually overridden PVC assignments should not be affected by later changes to the global identifiers on the port-level configuration interface.

While exemplary systems and methods embodying the present invention are shown by way of example, it will be understood, of course, that the invention is not limited to these embodiments. Modifications may be made by those skilled in the art, particularly in light of the foregoing teachings.

The present application hereby incorporates by reference as to its entire contents the following copending application filed concurrently herewith: U.S. Patent Application Serial No. TBD (attorney reference no. 03493.75009; client reference Pedersen 2), entitled "A Virtual Path Concentrator Node with Loopback."

We claim:

1. A method comprising the steps of:

assigning a first address of a first network protocol to each of a first plurality of sites of a first network and to each of a second plurality of sites of a second network interworked with the first network, the first network conforming to the first network protocol and the second network conforming to a second network protocol different from the first network protocol; and assigning a second address of the second network protocol to each of the first plurality of sites and to each of the second plurality of sites, wherein a combination of the first and second addresses assigned to each of the first and second plurality of sites is globally unique to each of the first and second plurality of sites.

2. The method of claim 1, wherein the step of assigning the second address further includes the step of assigning the second address of the second protocol type such that, for each of the first plurality of sites and each of the second plurality of sites, the second address is equal in value to the first address.

3. The method of claim 1, wherein the step of assigning the second address further includes the step of assigning the second address of the second protocol type such that, for each of the first plurality of sites and each of the second plurality of sites, the second address is different in value to the first address.

4. The method of claim 1, wherein the step of assigning the first addresses further includes assigning the first addresses as permanent addresses, and the step of assigning the second address further includes assigning the second addresses as permanent addresses.

5. The method of claim 1, wherein the first and network protocol is a local network protocol.

6. The method of claim 1, wherein the first address assigned to each of the first and second plurality of sites is globally unique to each of the first and second plurality of sites.

7. The method of claim 1, wherein the first network protocol is Asynchronous Transfer Mode (ATM) and the second work protocol is Frame Relay (FR).

8. The method of claim 7, wherein each of the first addresses is a value of at least one of an ATM Virtual Path Identifier and an ATM Virtual Channel Identifier, and each of the second addresses is a value of an FR Data Link Connection Identifier.

9. The method of claim 7, wherein the interworked first and second networks comprise a hub-and-spoke network, the first plurality of sites are each an ATM hub site, and the second plurality of sites are each a remote FR site.

10. The method of claim 1, further including the step of determining a subset of the second plurality of sites, the subset comprising those of the second plurality of sites having a connection to another of the second plurality of sites, the step of assigning the second addresses further including assigning the second addresses such that each of the second addresses assigned to each of the sites within the subset is unique within the subset.

* * * * *